(12) United States Patent
Mastrocola et al.

(10) Patent No.: US 6,339,643 B1
(45) Date of Patent: Jan. 15, 2002

(54) TELEPHONE DISABLE FEATURE

(75) Inventors: Angelo Rocco Mastrocola, West Lawn; James Skorko, Allentown; John P. Veschi, Fogelsville, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/239,683

(22) Filed: Jan. 29, 1999

(51) Int. Cl.[7] .................................................. H04M 9/00
(52) U.S. Cl. ............................ 379/433.06; 379/433.07; 379/368
(58) Field of Search ................................ 379/368, 370, 379/445, 433.06, 433.07, 428.01

(56) References Cited

U.S. PATENT DOCUMENTS

| | | | | |
|---|---|---|---|---|
| 5,333,173 A | * | 7/1994 | Seaholtz et al. | 379/46 X |
| 5,606,593 A | * | 2/1997 | Smith | 379/131 X |
| 5,812,650 A | * | 9/1998 | Gammino | 379/189 |
| 5,818,924 A | * | 10/1998 | King et al. | 379/389 |

* cited by examiner

*Primary Examiner*—Creighton Smith
(74) *Attorney, Agent, or Firm*—William H. Bollman

(57) ABSTRACT

Apparatus and process for allowing a user to selectively disable all or a portion of the manual controls, e.g., the keypad and/or other buttons (including switches, keys, on-hook button, and/or other buttons) of customer premises equipment. The customer premises equipment includes a button disabling module which allows subsequent control signals relating to the particular keys or buttons which have been disabled to be essentially ignored. Thus, for instance, if an on-hook button is inadvertently depressed while the on-hook button has been disabled by the button disabling module, the telephone line interface of the telephone will not signal the termination of the telephone call to the central office. The manual controls of the customer premises equipment can be disabled by the user in any of a number of different ways. For instance, a dedicated button at either the base unit or the handset of a telephone may be provided, or a sequence or simultaneous combination of alphanumeric keys and/or other buttons may be sensed. The disabled button(s) can be re-enabled either manually by the user, or automatically, e.g., after hanging up the telephone. A timer can be included to automatically re-enable any disabled manual controls (i.e., buttons) if the user failed to manually re-enable disabled buttons before terminating the previous telephone call.

35 Claims, 8 Drawing Sheets

TELEPHONE DISABLE FEATURE

BACKGROUND OF THE INVENTION

1. Field of the Invention

This invention relates generally to telephone customer premises equipment. More particularly, it relates to telephone customer premises equipment which is capable of alternately disabling and enabling the buttons of the telephone customer premises equipment to inhibit inadvertent activation of the buttons, e.g., of the keypad.

2. Background of Related Art

Many times, after a user has established a telephone call with another party, the user or other person inadvertently depresses or otherwise activates a button of the telephone. While having a tendency to happen with all types of telephones, this problem occurs perhaps most frequently with telephones having buttons (e.g., a keypad) located directly on the handset, e.g., the remote handset of a cordless telephone.

Generally, activation of one or more buttons of the telephone, e.g., a button of a keypad, can cause annoying functions, e.g., a DTMF tone on the telephone line resulting in a loud tone in the earpiece of the handset of the user and/or the other party. Sometimes, however, depending upon which button is depressed, activation of the button can actually cause a control function to occur or, worse yet, can cause inadvertent disconnection of the established telephone call.

For instance, when a user is connected to another party while using the remote handset of a cordless telephone, the user might accidentally terminate the telephone call by inadvertently activating the on-hook button, annoyingly interrupting the telephone call with DTMF tones, inadvertently change channels, etc. This type of inadvertent activation may happen most often while holding the remote handset closely against the head while using both hands to attend to another task, or even by a child playing with the remote handset.

FIG. 7 illustrates the relevant portion of a conventional telephone system 11 capable of allowing a user to establish a telephone call on a telephone line 15 with another party.

In particular, in FIG. 7, the telephone system 11 is connected to a telephone company central office 13 via the telephone line 15. A telephone line interface (TLI) 17 in the telephone system 11 provides the conventional isolation, DC and AC impedance as required by telephone company standards. The telephone line interface also provides a ring detect signal to a controller 19. The ring detect signal indicates to the controller 19 the ringing of an incoming telephone call on the telephone line 15. The controller 19 can be any suitable processor, e.g., a a microcontroller, or digital signal processor (DSP).

The telephone system 11 further includes conventional components and features, e.g., a handset 21 (which may be wired as shown or wireless), and a set of buttons including an alphanumeric keypad 23 for dialing appropriate telephone numbers, etc. The handset 21 may include an additional or alternative set of buttons including another alphanumeric keypad 21a to allow telephone functionality at the handset 21.

The particular buttons typically available on the handset 21 (and even on a base unit) allow control of the telephone line. For instance, upon activation of an on-hook/off-hook button, a telephone call would be hung up using a conventional telephone system. Moreover, activation of a channel selection key, or any of the 12 or 16 keys of a conventional alphanumeric keypad or other buttons (including switches, etc.) may cause interruptions or other annoyances to the users of the telephone system.

There is therefore a need for a telephone system which prevents interruptions and other annoyances to the users of a telephone system as desired during the time that the telephone is being used.

SUMMARY OF THE INVENTION

In accordance with the principles of the present invention, a set of buttons for customer premises equipment comprises at least one manual control. A button disabling module is adapted to selectively disable the at least one manual control on a call-by-call basis.

A method of disabling one or more manual controls of customer premises equipment in accordance with the principles of another aspect of the present invention comprises establishing a telephone call, and disabling at least one manual control on the customer premises equipment for a duration of the established telephone call only.

An apparatus for disabling at least one manual control of a customer premises equipment in accordance with yet another aspect of the present invention comprises means for allowing a user to disable at least one manual control of said customer premises equipment on a call-by-call basis.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a customer premises equipment (CPE), or enhanced telephone device, which allows suitable deactivation of any portion or all of the functions of the buttons of an alphanumeric keypad or other control features of the telephone equipment. Accordingly, customer premises equipment constructed in accordance with the principles of the present invention allows a user to enable and/or disable an appropriate portion (e.g., all or some) of the button-controlled (i.e., manual controlled) manual functions in a way that continues to allow functionality of the telephone as desired by the user. Thus, inadvertent hang-ups, annoying gaps, and/or transmission of dual tone multiple frequency (DTMF) tones on the telephone line, etc. can be prevented. A manual control is one in which the user of the customer premises equipment manually activates, e.g., by depression of a button, by sliding a slide switch, by keying in a predetermined code into a keypad, etc.

Figure 1:
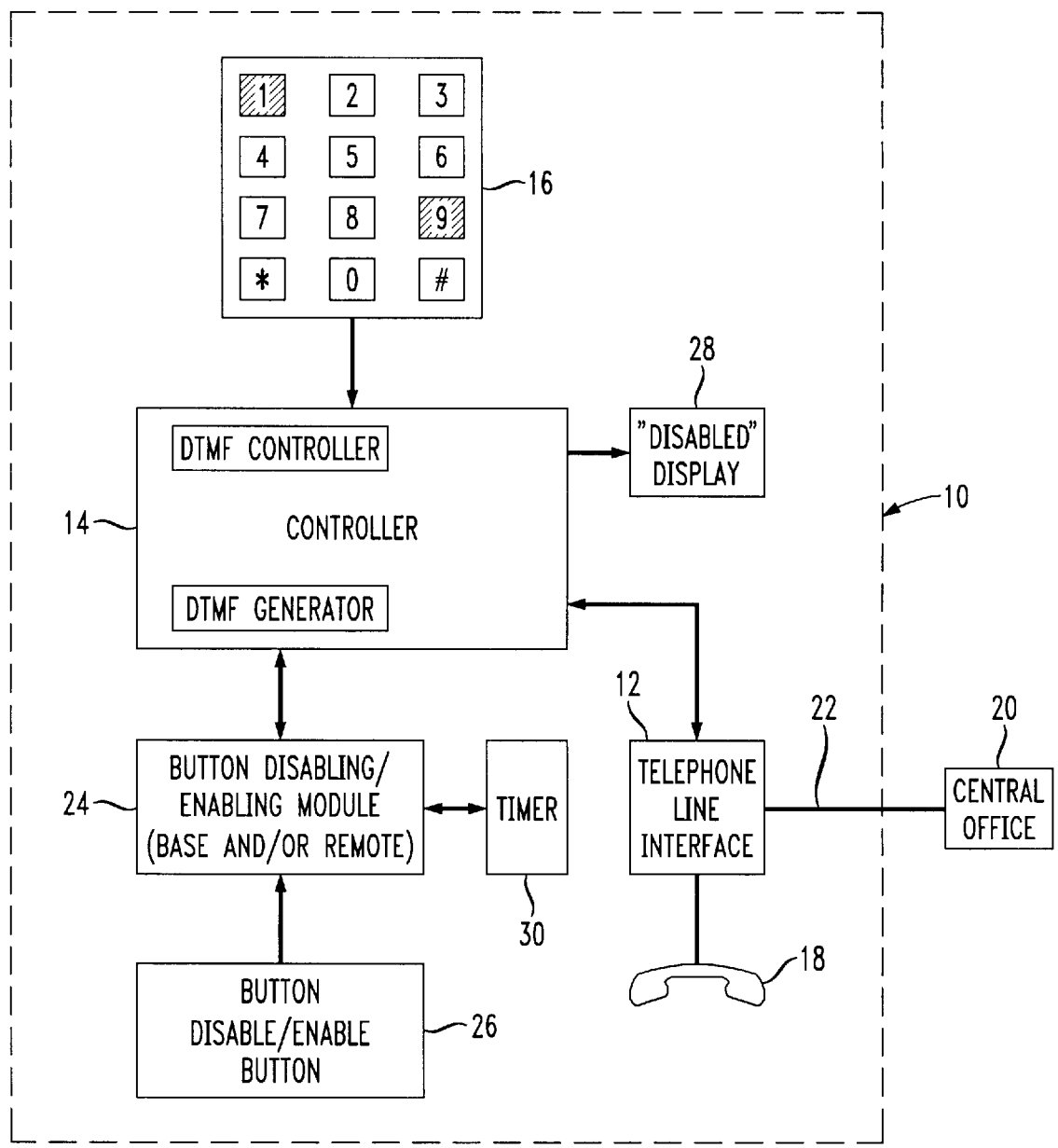
FIG. 1 is a block diagram illustrating a customer premises equipment which allows a user to disable and re-enable at least one manual control (e.g., one or more buttons on an alphanumeric keypad) of customer premises equipment to inhibit inadvertent activation of the one or more buttons (including switches), constructed in accordance with the principles of the present invention.

FIG. 1 illustrates an embodiment of a customer premises equipment which allows a user to alternately enable and disable at least one button of customer premises equipment to inhibit inadvertent depression or other manual activation of one or more of the buttons of the customer premises equipment.

In particular, in FIG. 1, a customer premises equipment 10 includes otherwise conventional components, e.g., a telephone line interface (TLI) 12, a controller 14, an alphanumeric keypad and/or other buttons 16, and a handset 18. The telephone line interface 12 is connected to a telephone company central office 20 via a telephone line 22.

The alphanumeric keypad and/or other buttons 16 allows manual control of the telephone 10, e.g., entry of a telephone number, on-hook/off-hook control, wireless channel selection (in the case of a cordless telephone), etc. The manual control signals from the alphanumeric keypad and/or other buttons (including switches) 16 are detected by the controller 14. The controller 14 may be any appropriate processor, e.g., a microprocessor, a digital signal processor (DSP), or a microcontroller.

Importantly, the customer premises equipment 10 illustrated in FIG. 1 further includes a button disabling/enabling module 24. The button disabling/enabling module 24 allows for the disablement (and/or subsequent enablement) of one or more features manually controlled using the keypad and/or other buttons 16. Thus, when in an enabled mode, the button disabling/enabling module 24 allows otherwise conventional operation of the telephone 10. However, when in a disabled mode (selected by a disable mode button, selected by the entry of a particular code into the keypad and/or other buttons 16, selected by the simultaneous activation of two or more predetermined buttons in the keypad and/or other buttons 16, etc.), the button disabling/enabling module 24 causes the controller 14 or other reacting circuitry to ignore any designated keypresses, switch movements or other activations of the keypad and/or other buttons 16.

The button disabling/enabling module 24 may be (but not necessarily is) a software module included within the program code of the controller 14. Moreover, the button disabling/enabling module 24 may be located in the base unit of the telephone 10, in the wired or remote handset of the telephone 10, or in both the base unit and the handset of the telephone 10. When located in both the base unit and the handset, the button disabling/enabling module 24 preferably allows disablement/enablement control of one or more manual controls in either or both the base unit and the handset. Of course, the button disabling/enabling module 24 can be implemented separate from the controller 14, but regardless, will preferably be in communication with the controller 14.

In one embodiment of the customer premises equipment 10 of the present invention, the user may activate or otherwise engage the disabling/enabling module 24 by depressing a predetermined sequence or pattern of keys or buttons on the keypad and/or other buttons 16, e.g., by simultaneously depressing the "1" and "9" buttons of the telephone number portion of the keypad and/or other buttons 16 shown by shaded buttons in FIG. 1. The predetermined sequence may be user programmable.

The re-enablement may or may not be performed using the same method as the disablement, e.g., one predetermined sequence may be defined for disablement and another predetermined sequence may be defined for re-.enablement. Moreover, individual keys may be disabled by unique predetermined sequences, e.g., simultaneous activation of the "1" button and whatever button is to be disabled, and any/all disabled buttons may be re-enabled by a simultaneous activation of the "1" and "9" buttons.

In the alternative (or additionally), the button disabling/enabling module 24 may be activated or otherwise engaged by the activation of a designated disable and/or enable button(s) 26. The disable and/or enable button(s) 26 may be of a physical form which is not easily activated, e.g., having a childproof nature, so as to prevent inadvertent activation. The disable/enable button(s) 26 may be located in the base unit, in the handset, or in both the base unit and the handset, in accordance with the principles of the present invention.

When the user activates or otherwise engages the button disabling/enabling module 24, a predefined (possibly user programmable) portion of the keypad and/or other buttons 16 is disabled. For instance, in the disclosed embodiment, all keys of the keypad and/or other buttons 16 are disabled for the remainder of the telephone call (but enabled by a predefined enabling sequence or pattern of buttons, designated enabling button, or other manual control to again enable the disabled keys). In this way, the telephone call can continue as a normal telephone call, but any future depression or activation of the disabled buttons or other manual control on the keypad and/or other buttons 16 will be essentially ignored by the customer premises equipment 10.

When the user wishes to return the customer premises equipment 10 to a normal operating mode with an enabled operating keypad and/or other buttons 16, the user simply substantially simultaneously activates a predetermined sequence or pattern of buttons, e.g., the "1" and "9" buttons or the disable/enable button 26 or by some other method, and the button disabling/enabling module 24 will activate and enable the keypad and/or other buttons 16 to operate in a normal manner.

The customer premises equipment may further include a display 28, in communication with the controller 14, to display the enable/disable status of the keypad and/or other buttons 16. Moreover, in the event that the predefined definition of the disabled keys is user programmable in the telephone 10, the display 28 may also be used to display the particular keys or features which have been disabled. The display 28 and buttons of the keypad and/or other buttons 16 together with the application program of the controller 14 may be used to pre-program and thus define user programmable parameters.

For instance, when particular keys of the keypad and/or other buttons 16 are disabled by the user as described above, the display 28 might generally indicate "BUTTON DISABLED". Additional information, e.g., as to which keys are currently disabled, may also be displayed.

The user may re-enable the disabled keys of the keypad and/or other buttons 16 by activation of the disable/enable button 26, which may function as a toggle control switch or by activating an alternative enable button. Alternatively, (or additionally to prevent inadvertent long term disablement of the keypad and/or other buttons 16 over more than one telephone call), a timer 30 may be included in the telephone to automatically (i e., without further user intervention), re-enable any disabled keys, e.g., immediately after hanging up a telephone by depressing the on-hook key, a period of time after the telephone is hung up, a period of time after disablement, etc.

After the user has re-enabled the previously disabled keys or buttons on the keypad and/or other buttons 16, the display 28 might be cleared, or might indicate, for instance, "BUTTON ENABLED". Of course, the display 28 can also be used for displaying other information associated with the customer premises equipment including, but not limited to, Caller ID information, telephone number dialed, telephone call duration, etc.

Figure 2:
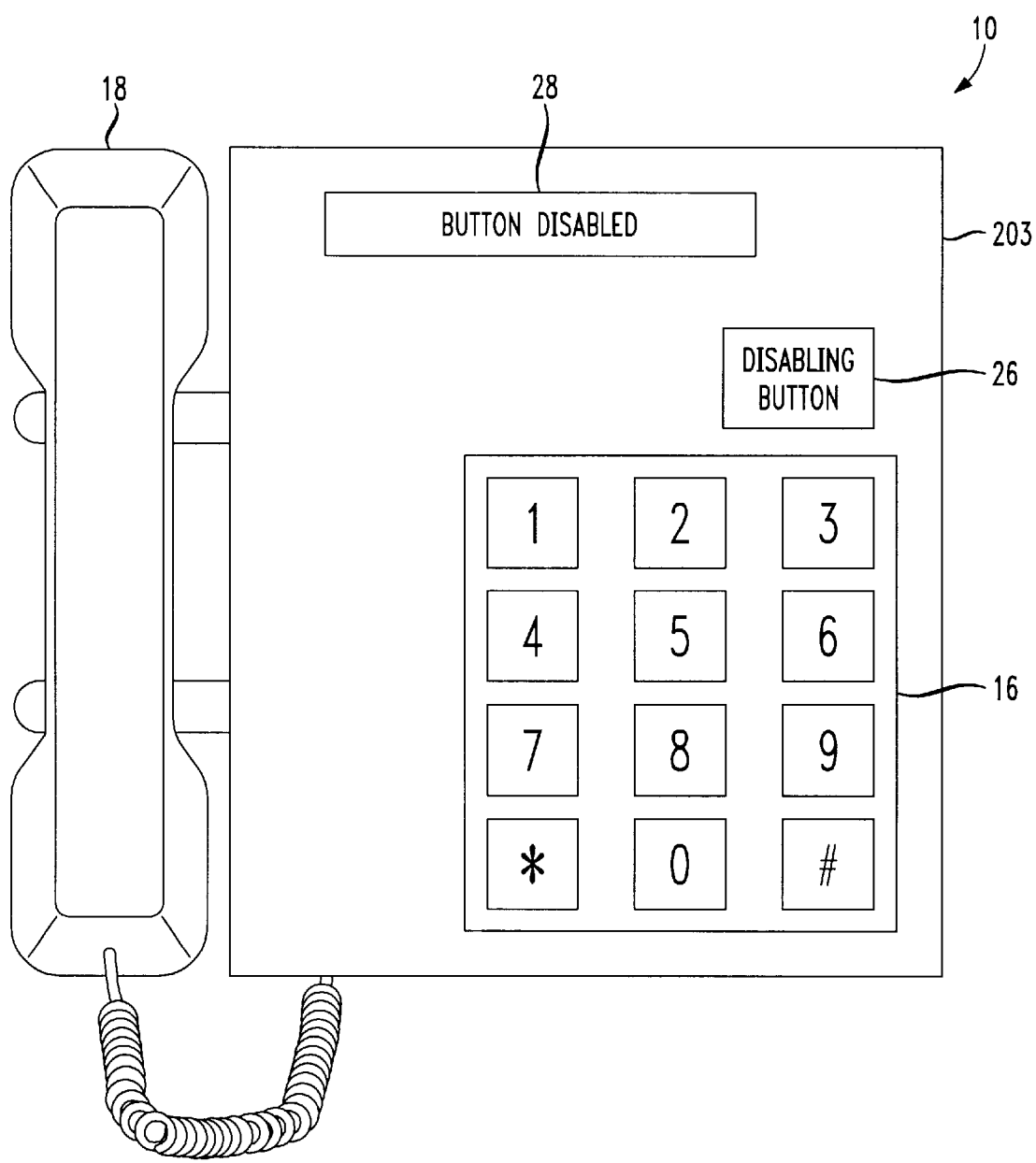
FIG. 2 is a top view illustrating an exemplary customer premises equipment which allows a user to disable and re-enable at least one manual control activated by at least one of a set of buttons, and including a display to indicate when the manual control is disabled, and a dedicated button for disabling the at least one manual control, constructed in accordance with the principles of the present invention.

FIG. 2 is a depiction of the telephone system 10 including a base unit 203 and a handset 18, wherein the display 28 and disable/enable button 26 are located on the base unit 203. Of course, the disable/enable button 26 may be located on either the base unit 203 or on the handset 18 (or may be embodied in a sequence or simultaneous selection of buttons 16), in accordance with the principles of the present invention.

Figure 3:
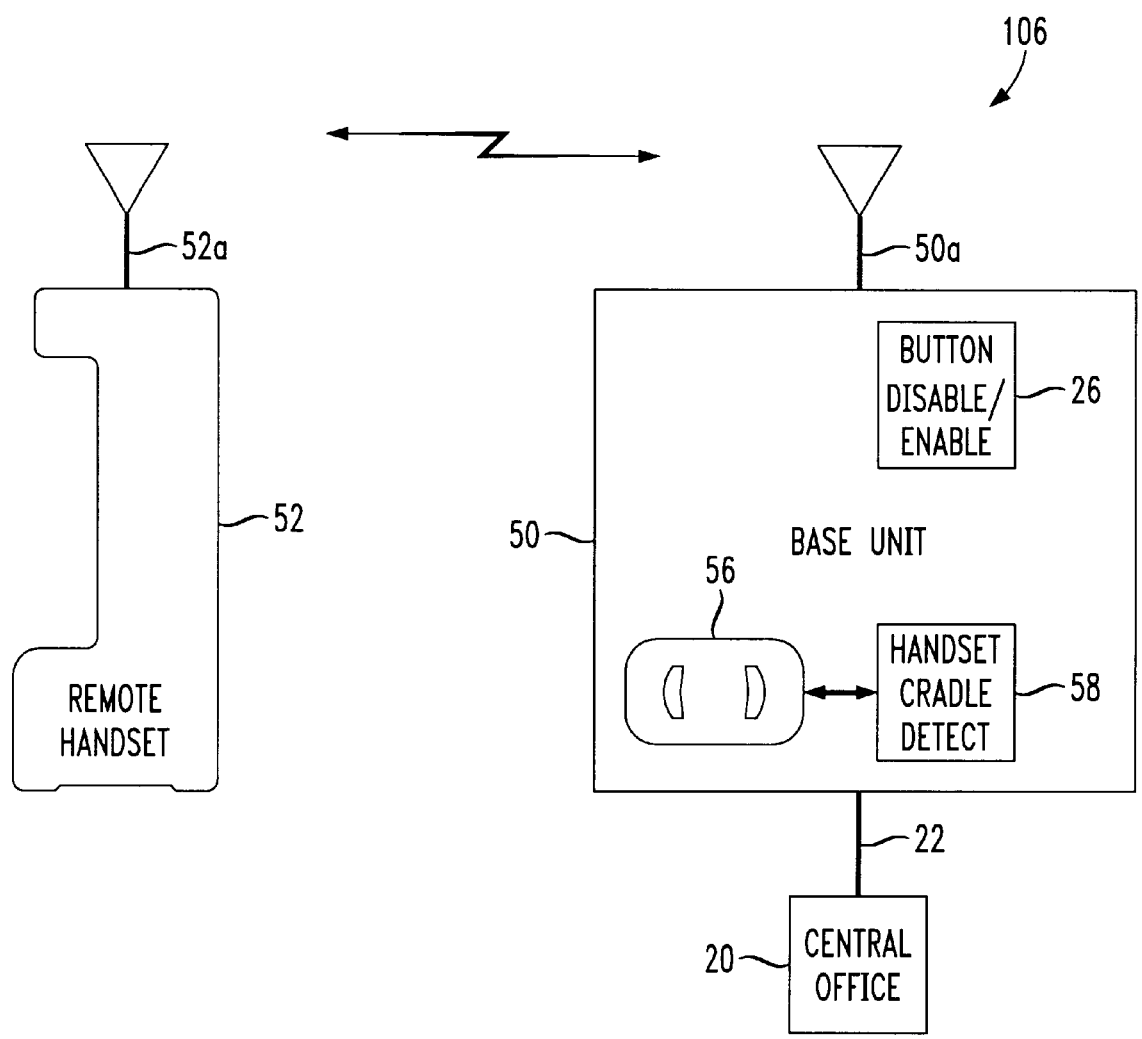
FIG. 3 is a block diagram illustrating a cordless telephone system which allows a user to alternately disable and enable at least one manual control based on a set of buttons of the cordless telephone to inhibit inadvertent depression of at least one of the buttons, constructed in accordance with the principles of the present invention.

FIG. 3 shows a cordless telephone incorporating a button disable feature in accordance with the present invention.

In particular, in FIG. 3, the customer premises equipment 10*b* is a cordless telephone including a base unit 50 and a remote handset 52.

The remote handset 52 receives power from the base unit 50 when inserted into an appropriate cradle 56 on the base unit 50. The base unit 50 is preferably able to detect that the remote handset 52 is cradled using an appropriate handset cradle detect mechanism or software algorithm 58.

When removed from the base unit 50, the remote handset 52 communicates with the base unit 50 using wireless communication means, e.g., radio frequencies (RF) between respective antennas 52*a*, 50*a*. The base unit 50 is connected to the telephone company central office 20 via a telephone line 22.

In accordance with the present invention, the base unit 50 can include a disable/enable feature 26 (e.g., a dedicated button) to allow disablement of all or a portion of the manual buttons on the base unit 50, on the remote handset 52, or on both the base unit 50 and on the remote handset 52.

Figure 4:
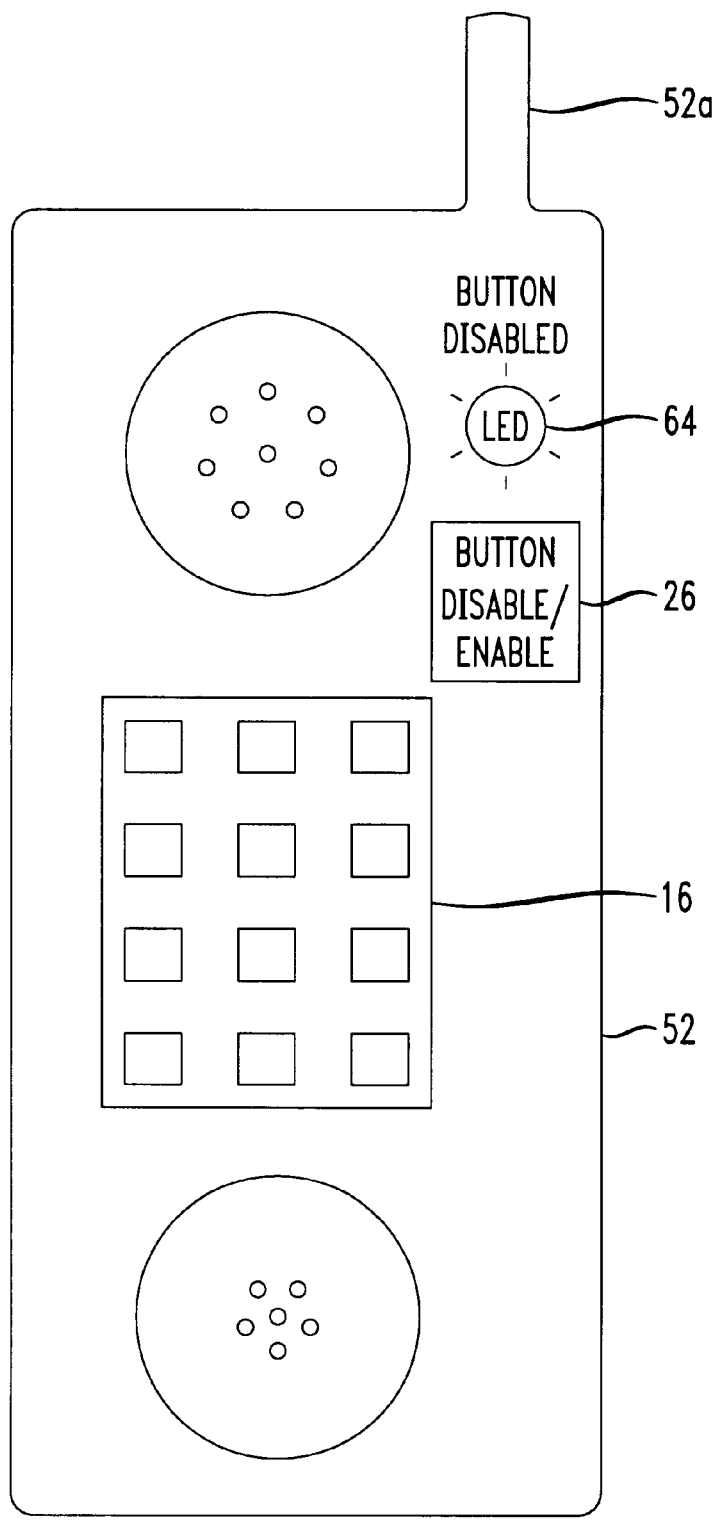
FIG. 4 is a front view illustrating a handset of a cordless telephone system shown in FIG. 3.

FIG. 4 shows the face of the remote handset 52 of the disclosed embodiment in more detail.

In particular, the remote handset 52 may include a disable/enable button 26 to allow the user to disable and/or enable particular keys on the keypad and/or other buttons 16 from the remote handset 52. Of course, the disable/enable button 26 may alternatively or additionally be located on the base unit 50 to allow disablement and/or enablement of the keypad and/or other buttons 16 on the remote handset 52.

A display 64 on the remote handset 52 is comprised of a simple indicator, e.g., a light-emitting diode (LED), which simply lights while the keypad and/or other buttons 16 are disabled. For instance, an illuminated or otherwise activated display 64 may indicate that one or more keys of the keypad and/or other buttons 16 are disabled. On the other hand, a non-illuminated or otherwise inactivated display 64 might indicate that the keypad and/or other buttons 16 are fully functional (i.e., enabled) to operate in an otherwise conventional fashion.

In addition to, or alternatively to, enabling disabled keys using the disable/enable button 26, a predetermined set of keypresses, etc., any disabled keys may be automatically (e.g., without further user intervention) re-enabled. In addition, re-cradling the remote handset 52 into the handset cradle 56 as detected by the handset cradle detect 58 may trigger activation of any disabled keys, either immediately upon re-cradling or after a predetermined amount of time after re-cradling the remote handset 52.

Alternatively, any disabled keys may be automatically re-enabled occasionally or periodically, e.g., once a day, e.g., at midnight. It is also within the principles of the present invention to permanently leave any disabled keys disabled unless and until the user re-enables the disabled keys, e.g., by re-activation of the disable/enable button 26 or other technique.

Figure 5:
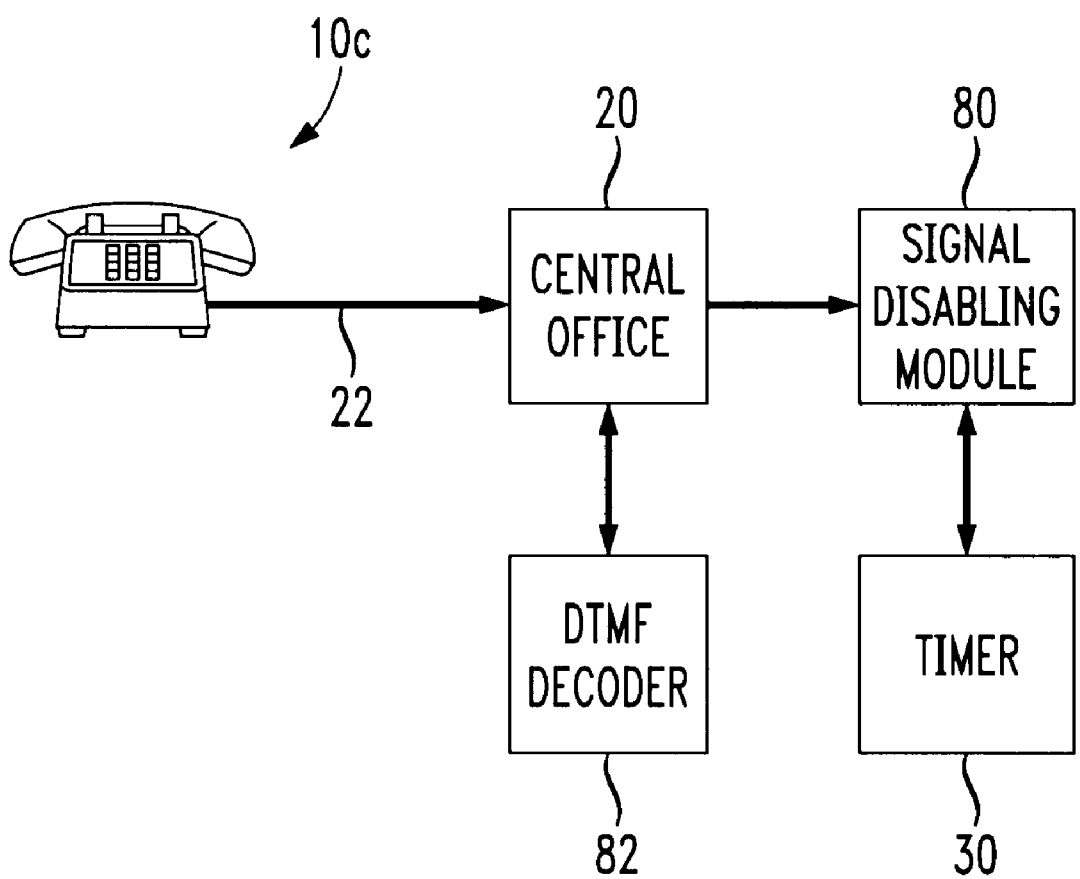
FIG. 5 is a block diagram illustrating another embodiment of customer premises equipment which allows a user to disable and enable at least one manual control based on a set of buttons, to inhibit inadvertent depression of at least one of the buttons, constructed in accordance with the principles of the present invention.

FIG. 5 shows that the button disable/enable may be handled to the extent possible at the central office 20 by essentially ignoring any inadvertent control signals caused by a manual operation at the serviced telephone 10*c*.

In particular, as illustrated in FIG. 5, yet another embodiment of the customer premises equipment 10 of the present invention allows the telephone company central office 20 to include a signal disabling module 80. The signal disabling module 80 is activated by the user of the telephone 10*c*, e.g., by an initial depression of a particular DTMF tone or sequence of DTMF tones which are sensed and decoded by a DTMF decoder 82 at the central office 20.

This activation/deactivation signal sent by the user to the central office 20 preferably occurs anytime after a telephone number is dialed or after a telephone call is established with another party. The signal disabling module 80 monitors the signal on the telephone line 22 to determine if future control signals from the telephone 10 (including possibly an on-hook signal) are to be ignored by the central office 20. Upon re-activation of the keypad and/or other buttons 16, using either the same or a different activation/deactivation signal, the central office 20 would resume processing of the telephone call as normal.

In the case of disablement of manual controls at the customer premises equipment by the central office 20, allowance can be made in the telephone 10 and/or central office 20 for the definition and detection of special, predetermined keypad combinations and/or sequences to again allow communication with the central office if re-enabling by the customer premises equipment is to be allowed. The special, predetermined keypad combinations and/or sequences are communicated to the central office using DTMF tones in the preferred embodiment, but may be in the form of other signals, e.g., frequency shift keying (FSK) signaling.

The central office 20 can control whether signals are accepted from the telephone 10, and can terminate that portion of control at an appropriate time on a use-by-use or call-by-call basis, and again allow that portion of control after the telephone 10 is determined to be back on-hook or otherwise re-cradled.

Central office disablement (and re-enablement) of one or more manual controls (i.e., buttons) is particularly useful in cordless telephone applications. For instance, when the handset remains away from the base unit even after a telephone call is terminated, a re-enabling button at the base unit may not be convenient for the user to activate. In such a case, the central office could re-enable the disabled button or buttons after detection of an on-hook condition at the far end. In such a case, when a far end party hangs up, the disablement might be re-enabled.

The disable and/or re-enable signaling may come from the central office based on an initial instruction originating from the user and/or remote handset, or alternatively originating from another caller to the central office.

The customer premises equipment 10 in accordance with the principles of the present invention includes a timer 30 associated with the button disabling/enabling module 24. The timer 30 counts the amount of time that the keypad and/or other buttons 16 are disabled. For instance, if the user disables the keypad and/or other buttons 16 during a telephone call, the user may inadvertently forget to enable the keypad and/or other buttons 16 such that when attempting to establish a subsequent telephone call, the keypad and/or other buttons 16 might otherwise remain disabled.

The timer 30 can be set for a predetermined time period such that upon expiration of the predetermined time period, the customer premises equipment 10 would automatically (i.e., without further user intervention) re-enable the keypad and/or other buttons 16 to again allow the user full functionality of the keypad and/or other buttons 16 without having to consciously remember to re-enable the keypad and/or other buttons 16. This may include re-enabling the telephone (even after the telephone goes on-hook), or re-enabling the central office to again allow processing of control signals from the telephone. The use of a timer may also be included within the embodiments, particularly when the central office controls the disablement and/or enablement.

Figure 6A:
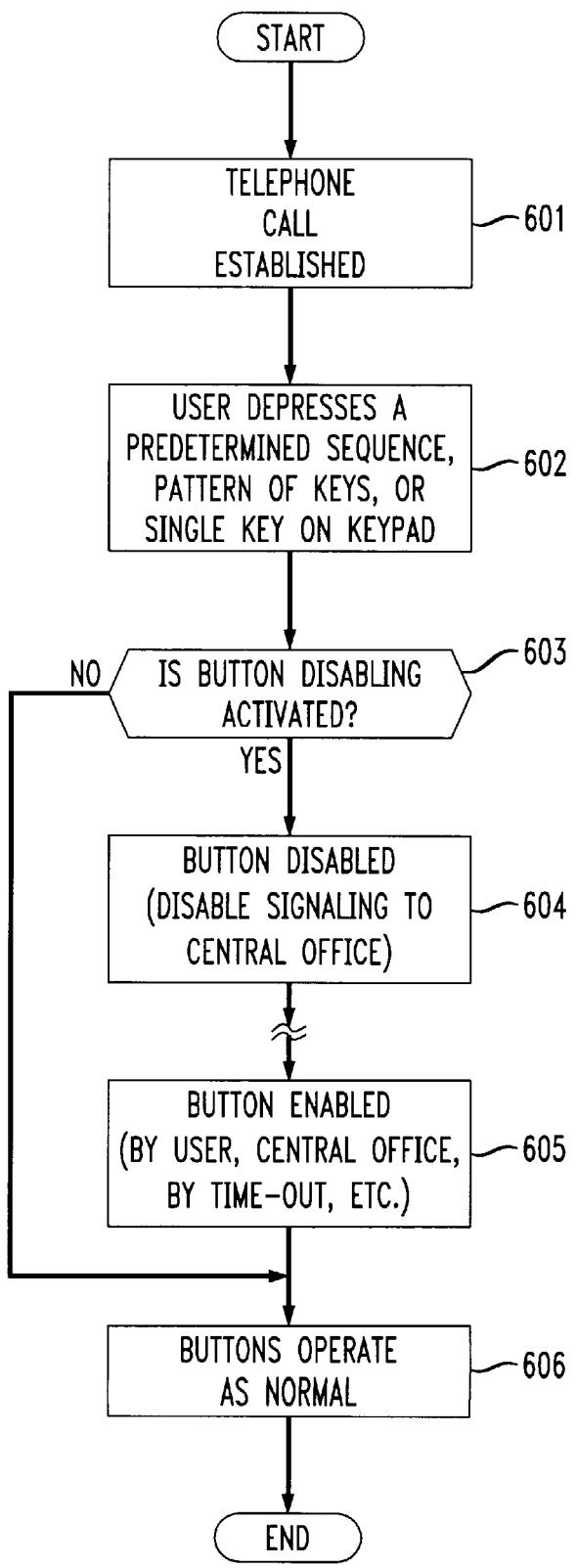
FIGS. 6A and 6B are flow charts illustrating exemplary processes by which customer premises equipment shown in FIG. 1 allows a user to disable and enable at least one manual control of a set of buttons, in accordance with the principles of the present invention.

FIG. 6A is a flow chart showing an exemplary process by which the button disabling/enabling module 24 of the customer premises equipment 10 in accordance with the principles of the present invention allows a user to disable and/or enable all or a portion of the keypad and/or other buttons 16 of the customer premises equipment 10.

With reference to FIG. 6A, in a first step 601, a telephone call is established, e.g., by the user calling another party, or by the user answering a call from another party.

In step 602, the user depresses or otherwise activates a button disabling/enabling module 24 to disable predefined keys on the keypad 16 using, e.g., a predetermined sequence of buttons on the keypad 16, a simultaneous pattern of buttons on the keypad and/or other buttons 16, activation of a single button, etc., depending on the particular application.

In decision step 603, the button disabling/enabling module 24 in conjunction with the controller 14 determines whether or not any of the buttons 16 have been disabled.

If the result of step 603 is NO, then all keys on the keypad and/or other buttons 16 will remain fully functional and will thus continue to operate in a normal manner. If, on the other hand, the result of step 603 is YES, then the appropriate keys of the keypad and/or other buttons are rendered disabled as shown in step 604. For instance, the buttons may be disabled by the customer premises equipment itself, ignoring any subsequent activations of the relevant keys until the keypad and/or other buttons 16 are again enabled. Alternatively, the buttons may be disabled by the central office by ignoring signaling or other telephone functions (e.g., on-hook).

In step 605, the previously disabled portion of the keypad and/or other buttons 16 is re-enabled. This may be accomplished in any of the discussed ways, e.g., by manual depression or activation of the disable/enable button 26, by a timeout of the timer 30, by the user depressing certain predetermined buttons on the keypad and/or other buttons 16, by the telephone company central office 20 sensing far end on-hook, by the user hanging up the handset, etc.

Once the keypad and/or other buttons 16 have been re-enabled, the keypad and/or other buttons 16 again fully operate in a normal fashion as shown in step 606.

Figure 6B:
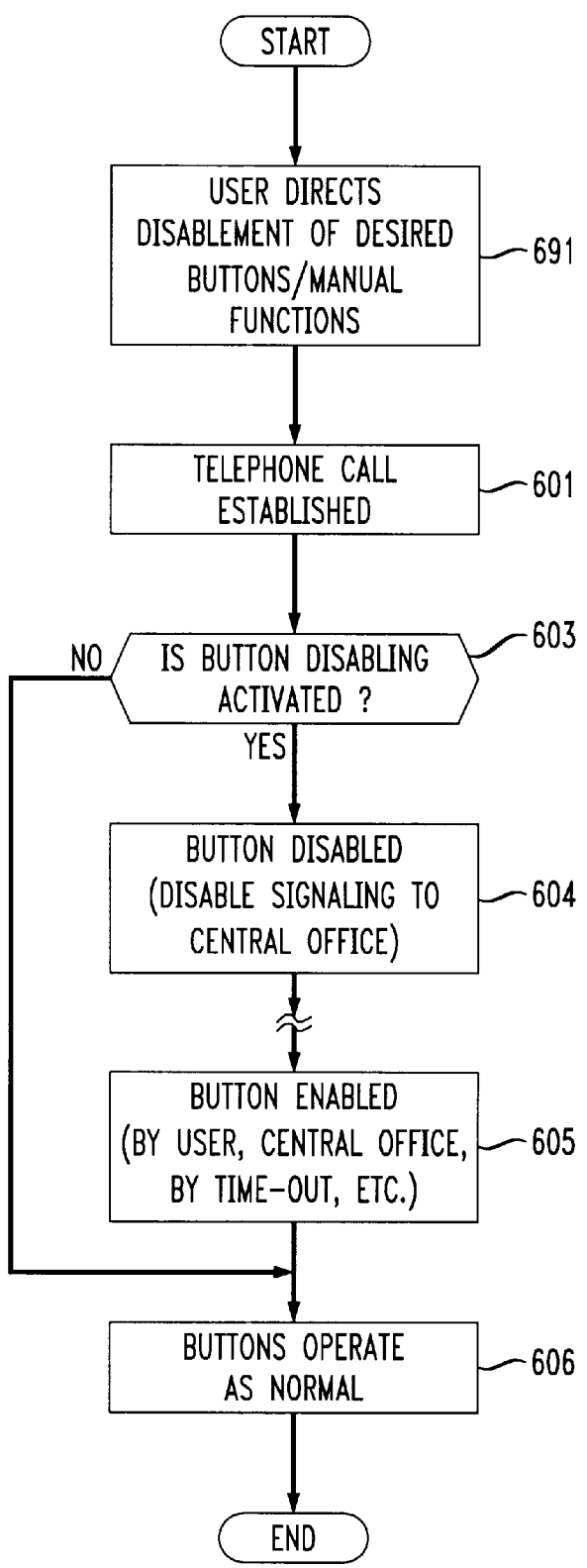
Figure 7:
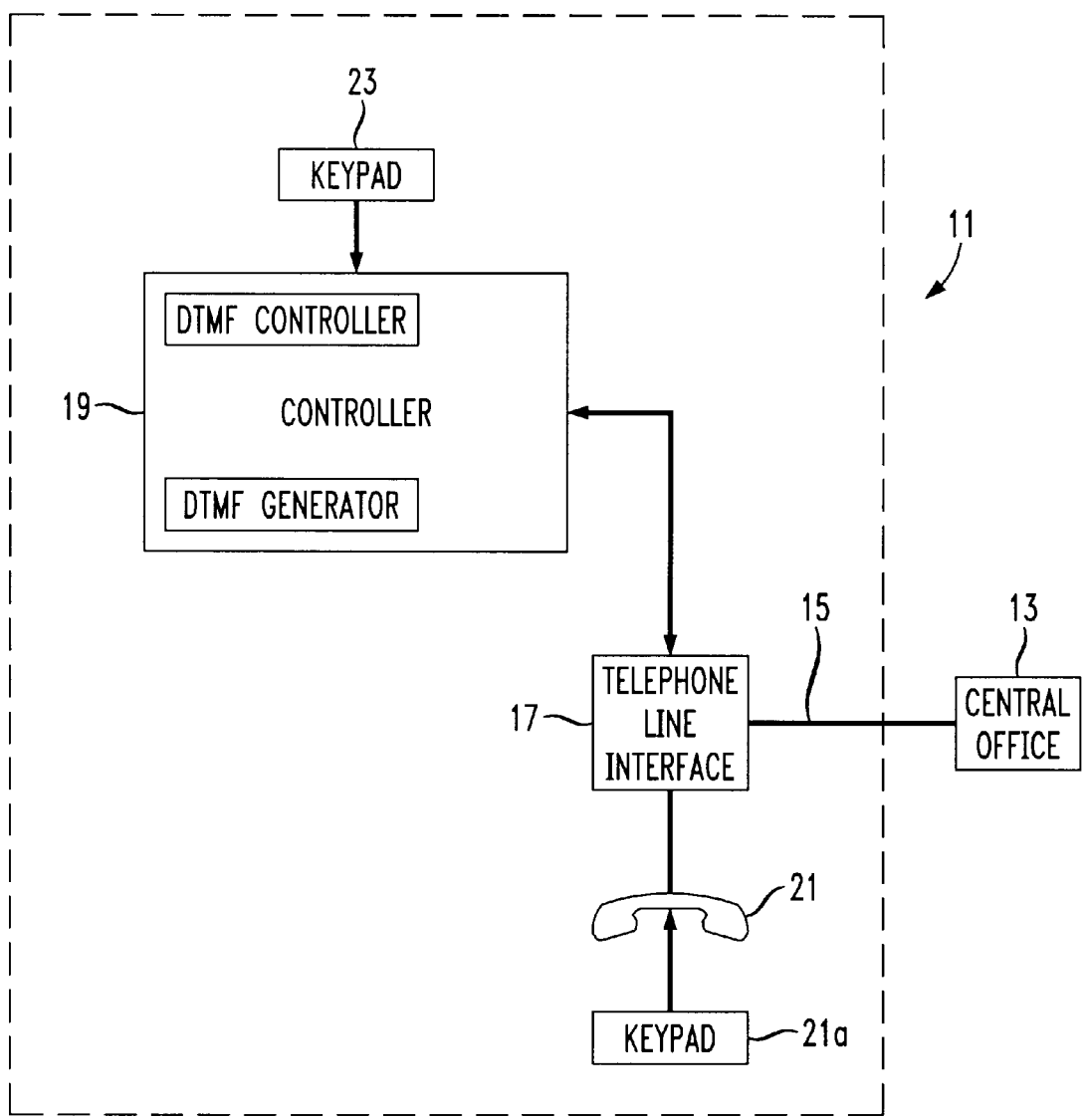
FIG. 7 illustrates conventional customer premises equipment.

FIG. 6B shows an alternative embodiment to that shown in FIG. 6A, i.e., wherein the disablement of the desired button or buttons (relating to certain manual functions) are determined by the user before the establishment of a telephone call.

In particular, in step 691, the user directs disablement of desired buttons/manual functions, e.g., by keying in a predetermined code sequence, either together with the desired telephone number or thereafter before the telephone call is fully established. For instance, a user might dial "800-555-1212-xyz", with the initial portion, i.e., "800-555-1212" of the dialed number relating to the desired telephone number and the ending portion "xyz" (i.e., "999") relating to the disablement of, e.g., the alphanumeric keys on the handset. Thus, even while the telephone call is being routed, certain manual functions can be disabled.

The predetermined code sequence can be automatically appended to the dialed telephone number based on certain conditions, e.g., the position of a slide or other switch, a recognition of all or a portion of the particular telephone number dialed, etc.

In step 601, a telephone call for which the disablement will be effective is established. After establishment of the telephone call in step 601, steps 603-606 are performed as described with reference to FIG. 6A.

Customer premises equipment 10 including the ability to selectively disable all or a portion of a keypad and/or other buttons (i.e., any manual control) is particularly useful. For instance, anyone who has had young children around while talking on the telephone would appreciate the vulnerability of an established telephone call to inadvertent control signals (e.g., on-hook signals, DTMF tones, etc.) and would appreciate the security and peace of mind that the present invention provides to help avoid, e.g., annoying DTMF tones occurring during a telephone call, inadvertently hanging up a telephone call, etc.

The keypad enabling/disabling feature in accordance with the principles of the present invention can be incorporated in all types of telephone systems including, but not limited to, telephone systems having manual controls on its base unit, telephone systems having manual controls on its handset, cordless telephones, cellular telephones, etc.

The language "button" as referred to herein may be any electrical and/or mechanical control means, e.g., a momentary switch, a two position switch, a slide switch, etc. Moreover, the buttons refer not only to those normally associated with a 12 or 16 key alphanumeric keypad, but also to other buttons on the customer premises equipment, e.g., a power button, a send button, a mute button, an on-hook switch, and to any other type of user input mechanism, e.g., a touch screen, track ball, mouse, etc.

While the invention has been described with reference to the exemplary embodiments thereof, those skilled in the art will be able to make various modifications to the described embodiments of the invention without departing from the true spirit and scope of the invention.

What is claimed is:

1. A button set for customer premises equipment, comprising:

at least one manual control; and a button disabling module adapted to selectively disable said at least one manual control on a call-by-call basis.

2. The button set for customer premises equipment according to claim 1, wherein said at least one manual control comprises:

a DTMF tone.

3. The button set for customer premises equipment according to claim 1, further comprising:

a button coupled to said button disabling module.

4. The button set for customer premises equipment according to claim 3, wherein:

said button is comprised in a handset of a telephone.

5. The button set for customer premises equipment according to claim 1, wherein:

said button disabling module is activated to disable said at least one manual function upon activation of a dedicated button.

6. The button set for customer premises equipment according to claim 1, wherein:

said button disabling module is activated to disable said at least one manual function upon activation of a plurality of buttons.

7. The button set for customer premises equipment according to claim 6, wherein:

said plurality of buttons are pressed substantially simultaneously.

8. A button set for customer premises equipment, comprising:

at least one manual control comprising an on-hook switch; and a button disabling module adapted to selectively disable said at least one manual control on a call-by-call basis.

9. A button set for customer premises equipment, comprising:

at least one manual control;

a button disabling module adapted to selectively disable said at least one manual control on a call-by-call basis; and a handset cradle detect module adapted to detect an insertion of a remote handset comprising said button set into a handset cradle.

10. The button set for customer premises equipment according to claim 9, wherein:

said button disabling module is adapted to re-enable said at least one manual control upon detection of said remote handset in said handset cradle.

11. The button set for customer premises equipment according to claim 9, wherein:

said button disabling module is adapted to re-enable said at least one manual control upon termination of a present telephone call.

12. A button set for customer premises equipment, comprising:

at least one manual control; and a button disabling module adapted to selectively disable said at least one manual control on a call-by-call basis; wherein said button disabling module is adapted to re-enable said at least one manual control upon time out of a timer.

13. A button set for customer premises equipment, comprising:

at least one manual control; and a button disabling module adapted to selectively disable said at least one manual control on a call-by-call basis;

wherein said at least one manual control is located in customer premises equipment; and said button disabling/enabling module is located at a telephone company central office.

14. A method of disabling a manual control of customer premises equipment, said method comprising:

establishing a telephone call; and disabling at least one manual control on said customer premises equipment for a duration of said established telephone call.

15. The method of disabling a manual control of customer premises equipment according to claim 14, wherein:

said at least one manual control is an on-hook indicator.

16. The method of disabling a manual control of customer premises equipment according to claim 14, wherein:

said at least one manual control provides a DTMF tone.

17. The method of disabling a manual control of customer premises equipment according to claim 14, wherein:

said step of disabling is performed from a handset of said customer premises equipment.

18. The method of disabling a manual control of customer premises equipment according to claim 14, wherein:

said step of disabling is performed from a base unit of said customer premises equipment.

19. The method of disabling a manual control of customer premises equipment according to claim 14, further comprising:

re-enabling said at least one manual control at a conclusion of said established telephone call.

20. The method of disabling a manual control of customer premises equipment according to claim 14, further comprising:

automatically re-enabling said at least one manual control without user intervention.

21. The method of disabling a manual control of customer premises equipment according to claim 20, wherein:

said automatic re-enabling is periodically performed.

22. The method of disabling a manual control of customer premises equipment according to claim 14, wherein:

said disabling is performed after said establishment of said telephone call.

23. The method of disabling a manual control of customer premises equipment according to claim 14, further comprising:

timing an amount of time said at least one manual control is disabled; and re-enabling said at least one manual control upon expiration of said amount of time.

24. The method of disabling a manual control of customer premises equipment according to claim 14, wherein:

said disabling is performed at a central office in communication with said customer premises equipment.

25. The method of disabling a manual control of customer premises equipment according to claim 24, wherein:

said disabling is terminated at said central office based on signaling from a far end customer premises equipment.

26. The method of disabling a manual control of customer premises equipment according to claim 25, wherein:

said signaling indicates an on-hook condition of said far end customer premises equipment.

27. The method of disabling a manual control of customer premises equipment according to claim 24, wherein:

said disabling is terminated at said central office based on signaling from said customer premises equipment.

28. The method of disabling a manual control of customer premises equipment according to claim 25, wherein:

said signaling is based on an on-hook condition of said far end customer premises equipment.

29. An apparatus for disabling a manual control of customer premises equipment, comprising:

means for allowing a user to disable at least one manual control on a button set of said customer premises equipment on a call-by-call basis.

30. An apparatus for disabling a manual control of customer premises equipment, comprising:

means for allowing a user to disable at least one manual control on a button set of said customer premises equipment on a call-by-call basis;

wherein said at least one manual control is an on-hook switch.

31. An apparatus for disabling a manual control of customer premises equipment, comprising:

means for allowing a user to disable at least one manual control on a button set of said customer premises equipment on a call-by-call basis;

wherein said at least one manual control is a DTMF tone.

32. An apparatus for disabling a manual control of customer premises equipment, comprising:

means for allowing a user to disable at least one manual control on a button set of said customer premises equipment on a call-by-call basis; and timer means adapted to limit an amount of time that said at least one manual control is disabled such that upon expiration of a predetermined amount of time, said at least one manual control is automatically enabled.

33. Apparatus for disabling a manual control of customer premises equipment, comprising:

means for establishing a telephone call; and means for disabling at least one manual control on said customer premises equipment for a duration of said established telephone call.

34. The apparatus for disabling a manual control of customer premises equipment according to claim 33, wherein:

said at least one manual control is an on-hook switch.

35. The apparatus for disabling a manual control of customer premises equipment according to claim 33, wherein:

said at least one manual control is a DTMF tone.

* * * * *